United States Patent
Osuga et al.

(10) Patent No.: US 12,400,800 B2
(45) Date of Patent: Aug. 26, 2025

(54) SOLID ELECTROLYTIC CAPACITOR AND METHOD FOR PRODUCING SOLID ELECTROLYTIC CAPACITOR

(71) Applicant: Nippon Chemi-Con Corporation, Tokyo (JP)

(72) Inventors: Yuki Osuga, Fukushima (JP); Hideyuki Omichi, Fukushima (JP); Masayuki Tarumi, Fukushima (JP)

(73) Assignee: Nippon Chemi-Con Corporation, Tokyo (JP)

( * ) Notice: Subject to any disclaimer, the term of this patent is extended or adjusted under 35 U.S.C. 154(b) by 0 days.

(21) Appl. No.: 18/276,434

(22) PCT Filed: Mar. 8, 2022

(86) PCT No.: PCT/JP2022/010035
§ 371 (c)(1),
(2) Date: Aug. 8, 2023

(87) PCT Pub. No.: WO2022/196449
PCT Pub. Date: Sep. 22, 2022

(65) Prior Publication Data
US 2024/0128025 A1 Apr. 18, 2024

(30) Foreign Application Priority Data
Mar. 18, 2021 (JP) ................................ 2021-045202

(51) Int. Cl.
*H01G 9/028* (2006.01)
*H01G 9/00* (2006.01)
(Continued)

(52) U.S. Cl.
CPC ........... *H01G 9/028* (2013.01); *H01G 9/0036* (2013.01); *H01G 9/0425* (2013.01); *H01G 9/15* (2013.01)

(58) Field of Classification Search
None
See application file for complete search history.

(56) References Cited

U.S. PATENT DOCUMENTS

| 6,473,293 | B2 * | 10/2002 | Shimada | ................ | H01G 11/48 |
|---|---|---|---|---|---|
| | | | | | 29/25.03 |
| 11,948,755 | B2 * | 4/2024 | Koseki | ................ | H01G 9/0425 |

(Continued)

FOREIGN PATENT DOCUMENTS

| CN | 107851518 | A | * | 3/2018 | ............. | B60R 13/02 |
|---|---|---|---|---|---|---|
| CN | 108597877 | A | * | 9/2018 | ............. | H01G 9/022 |

(Continued)

OTHER PUBLICATIONS

CN '518 Translation (Year: 2018).*

(Continued)

*Primary Examiner* — Dion R. Ferguson
(74) *Attorney, Agent, or Firm* — Potomac Law Group, PLLC

(57) ABSTRACT

The present disclosure provides a solid electrolytic capacitor and a production method thereof which improve the opportunity to repair defects and reduce leakage current. An electrolytic capacitor includes a capacitor element, a conductive polymer layer, and electrolytic solution. The capacitor element is formed by facing anode foil and a cathode body. The conductive polymer layer is formed by impregnating dispersion including a solvent and particles or powder of a conductive polymer. The electrolytic solution is impregnated in the capacitor element. Here, the cathode body includes cathode foil and a carbon layer. The cathode foil is formed of valve action metal, and an enlarged surface layer is formed on a surface thereof. The carbon layer is laminated on the enlarged surface layer and contacts with the conductive polymer layer at a surface opposite the enlarged surface layer. Also, the amount of the particles or powder of the (Continued)

conductive polymer included in the enlarged surface layer is less than the particles or powder of the conductive polymer included in the carbon layer at the surface-layer side facing the conductive polymer layer.

14 Claims, 2 Drawing Sheets

(51) Int. Cl.
*H01G 9/042* (2006.01)
*H01G 9/15* (2006.01)

(56) References Cited

U.S. PATENT DOCUMENTS

| | | | | |
|---|---|---|---|---|
| 2002/0097550 | A1* | 7/2002 | Shimada | H01G 9/15 361/532 |
| 2006/0139846 | A1* | 6/2006 | Mori | H01G 11/38 361/272 |
| 2011/0281170 | A1* | 11/2011 | Mitsuda | H01G 11/70 29/25.03 |
| 2018/0047511 | A1 | 2/2018 | Tsuda | |
| 2019/0304704 | A1 | 10/2019 | Ishimaru et al. | |
| 2021/0193395 | A1 | 6/2021 | Koseki et al. | |
| 2021/0313119 | A1 | 10/2021 | Ishimaru et al. | |
| 2022/0262576 | A1* | 8/2022 | Koseki | H01G 9/0425 |
| 2022/0277901 | A1* | 9/2022 | Hirota | H01G 9/15 |
| 2024/0128025 | A1* | 4/2024 | Osuga | H01G 9/0425 |

FOREIGN PATENT DOCUMENTS

| | | | |
|---|---|---|---|
| EP | 4333004 A1 | 3/2024 | |
| EP | 4336527 A1 | 3/2024 | |
| EP | 4404226 A1 | 7/2024 | |
| JP | 2005-223197 A | 8/2005 | |
| JP | 2006-114540 A | 4/2006 | |
| JP | 2019-179884 A | 10/2019 | |
| JP | 2020072206 A * | 5/2020 | ............. H01G 11/48 |
| JP | 2020-141072 A | 9/2020 | |
| JP | 2021-012923 A | 2/2021 | |
| WO | WO2016174806 A1 * | 2/2018 | |
| WO | 2019/240041 A1 | 12/2019 | |
| WO | 2020/059609 A1 | 3/2020 | |

OTHER PUBLICATIONS

International Search Report for International Patent Application No. PCT/JP2022/010035, Jun. 7, 2022.
Office Action issued Oct. 8, 2024, in Japanese Patent Application No. 2021-045202.
Office Action issued Mar. 11, 2025, in Japanese Patent Application No. 2021-045202.
Office Action issued Mar. 27, 2025, in Korean Patent Application No. 2023-7016621.
Extended European Search Report and European Search Opinion issued Jul. 1, 2025, in European Patent Application No. 22771201.5.

* cited by examiner

SOLID ELECTROLYTIC CAPACITOR AND METHOD FOR PRODUCING SOLID ELECTROLYTIC CAPACITOR

FIELD OF INVENTION

The present disclosure relates to a hybrid-type solid electrolytic capacitor which uses a solid electrolyte and electrolytic solution together and a production method thereof.

BACKGROUND

In electrolytic capacitors utilizing valve action metal such as tantalum, aluminum, and the like, by making the valve action metal as an anode-side facing electrode into shapes of a sintered body or etching foil, and the like, to enlarge the surface, the electrolytic capacitors can be downsized and can have large capacity. In particular, since solid electrolyte capacitors in which dielectric oxide film is covered by a solid electrolyte are compact, large capacity, low equivalent series resistance, easy to chip, and suitable for surface mount, they are essential for downsizing, high functionality, and cost reduction of electronic devices.

Manganese dioxide and 7,7,8,8-tetracyanoquinodimethane (TCNQ) complex are known as solid electrolytes. In recent years, conductive polymers derived from monomers with r-conjugated double bonds are rapidly becoming popular as solid electrolytes. For example, conductive polymers may be poly(3,4-ethylenedioxythiophene) (PEDOT). Conductive polymers express high conductivity when using polyanions such as organic sulfonic acid and the like as a dopant and express excellent adhesion to dielectric oxide film in the chemical oxidative polymerization or electrolytic oxidative polymerization.

Here, when defect is produced in the dielectric oxide film formed on anode foil and in oxide film naturally or intentionally formed on cathode foil, the leakage current becomes large. For example, the defect of the anode foil and the cathode foil is produced due to reflow heat when implementing the solid electrolytic capacitor. That is, when heat is applied on the foil in a reflow process, the oxide film cannot follow the expansion of the valve action metal due to the difference between the heat expansion coefficients of the valve action metal that is the foil material and the oxide film, producing the defect in the oxide film.

In a liquid-type electrolytic capacitor using electrolytic solution, the electrolytic solution repairs the defect, so that the leakage current can be suppressed. However, the solid electrolytic capacitor is less effective in repairing the defect in the dielectric oxide film than the liquid-type electrolytic capacitor in which capacitor element is impregnated with electrolytic solution and which does not have conductive polymer layers. Accordingly, a so-called hybrid-type solid electrolytic capacitor in which the conductive polymer layers are formed on the capacitor element that is anode foil and cathode foil facing each other while impregnating air gaps of the capacitor element with the electrolytic solution is getting attention.

PRIOR ART DOCUMENT

Patent Document

Patent Document 1: JP2006-114540A

SUMMARY OF INVENTION

Problems to be Solved by Invention

However, the solid electrolytic capacitor is less effective in repairing the defect in the oxide film and tends to have larger leakage current in comparison with the liquid-type electrolytic capacitor which does not have conductive polymer layers even when the electrolytic solution is used together.

The present disclosure is proposed to address the above-described problems, and the objective is to provide a solid electrolytic capacitor and a production method thereof with improved chance of repairing the defect and reduced leakage current.

Means to Solve the Problem

To address the above-described problem, a solid electrolytic capacitor of the present disclosure includes: a capacitor element formed by facing anode foil and a cathode body; a conductive polymer layer formed by impregnating the capacitor element with dispersion including a solvent and particles or powder of a conductive polymer; and electrolytic solution impregnated in the capacitor element, in which the cathode body includes cathode foil formed of valve action metal and with a enlarged surface layer on a surface thereof, and a carbon layer laminated on the enlarged surface layer and contacting with the conductive polymer layer opposite the surface enlarged layer, and an amount of the particles or powder of the conductive polymer included in the enlarged surface layer is less than an amount of the particles or powder of the conductive polymer included in the carbon layer at a surface-layer side facing the conductive polymer layer.

Although it is not limited to this, if the particles or powder of the conductive polymer attaches to the defected portion, it is assumed that the defected portion will not be repaired because the particles or powder of the conductive polymer become an obstacle. From this assumption, if the particles or powder of the conductive polymer attaching to the oxide film can be reduced, there will be more opportunities to repair the defected portion, which will improve the defect repairing action and lead to the leakage current reduction.

However, since the conductive polymer layer becomes the true cathode in the electrolytic capacitor, the conductive polymer layer must be adhered to the dielectric oxide film formed on the anode foil. In contrast, the total number of the defected portion can be reduced also by repairing the defected portion produced on the oxide film naturally or intentionally formed on cathode foil. Therefore, the carbon layer is arranged on the cathode foil to prevent the particles or powder of the conductive polymer from moving from the conductive polymer layer to the enlarged surface area with the oxide film. Also, the amount of the particles or powder of the conductive polymer included in the enlarged surface layer is less than the particles or powder of the conductive polymer included in the carbon layer at the surface-layer side facing the conductive polymer layer.

By this, the number of the defected portion in the entire solid electrolytic capacitor is reduced by the number of opportunities to repair the defected portion at the cathode side, and the leakage current can be reduced. Although the oxide film must be formed on the enlarged surface layer of the cathode foil, this oxide film may be formed naturally or intentionally. Furthermore, the electrolytic solution can pass through the carbon layer.

Note that it is not necessary to completely eliminate the particles or powder of the conductive polymer in the enlarged surface are if the possibility of the particles or powder of the conductive polymer blocking the defected portion at the cathode side is reduced. Furthermore, an amount of the particles or powder of the conductive polymer included in the carbon layer at an enlarged-surface-layer side facing the enlarged surface may be less than the amount of the particles or powder of the conductive polymer included in the carbon layer at the surface-layer side and more than the amount of the particles or powder of the conductive polymer included in the enlarged surface layer. That is, density of the particles or powder of the conductive polymer included in the carbon layer may be gradient.

The carbon layer may be compressed and pressure-welded to the etching layer. By this, carbon material forming the carbon layer is arranged more irregularly, so that the carbon layer has a so-called labyrinth structure in which air gaps in the carbon layer from the surface-layer side to the enlarged surface layer is cut in the middle or meanders. Accordingly, even if the particles or powder of the conductive polymer enter into the airgaps, the particles or powder do not reach the enlarged surface layer and is trapped in the carbon layer. As a result, the penetration of the particles or powder of the conductive polymer into the enlarged surface layer is suppressed. Furthermore, the carbon layer is compressed so that the carbon material is densely arranged across the entire surface of the cathode foil, and the cathode body as a whole suppresses the penetration of the particles or powder of the conductive polymer into the enlarged surface layer.

Furthermore, by press-welding the carbon layer, the size of the opening of the airgaps in the carbon layer becomes smaller, so that the average diameter of the airgaps in the carbon layer becomes equal to or smaller than the diameter of the particles or powder of the conductive polymer that would affect the repairing of the defect in the oxide film. In addition, it is difficult for the carbon material to be liberated from the carbon layer, and the carbon material is prevented from adhering to the dielectric oxide film of the anode foil, reducing the insulation or adhering to the defected portion of the dielectric oxide film.

Also, to address the above-described problem, a production method of the solid electrolytic capacitor is one aspect of the present disclosure, and the production method of the solid electrolytic capacitor includes: a carbon layer formation process of forming a carbon layer on an enlarged surface layer formed on a cathode foil made of valve action metal; a pressing process of pressing the carbon layer on the cathode foil, an element formation process of forming a capacitor element by facing a cathode body including the cathode foil and the carbon layer and an anode body; a dispersion impregnation process of impregnating the capacitor element with dispersion including a solvent and particles or powder of a conductive polymer; and an electrolytic solution impregnation process of impregnating the capacitor element with electrolytic solution. By this, the carbon layer is compressed and is pressure-welded on the enlarged surface layer.

Effect of Invention

According to the present disclosure, the defect repairing action for the oxide film at the cathode side is improved and the leakage current can be reduced.

EMBODIMENTS

Hereinafter, a solid electrolytic capacitor according to the embodiment of the present disclosure will be described. Note that the present disclosure is not limited to the following embodiments.

(Configuration)

Figure 2:
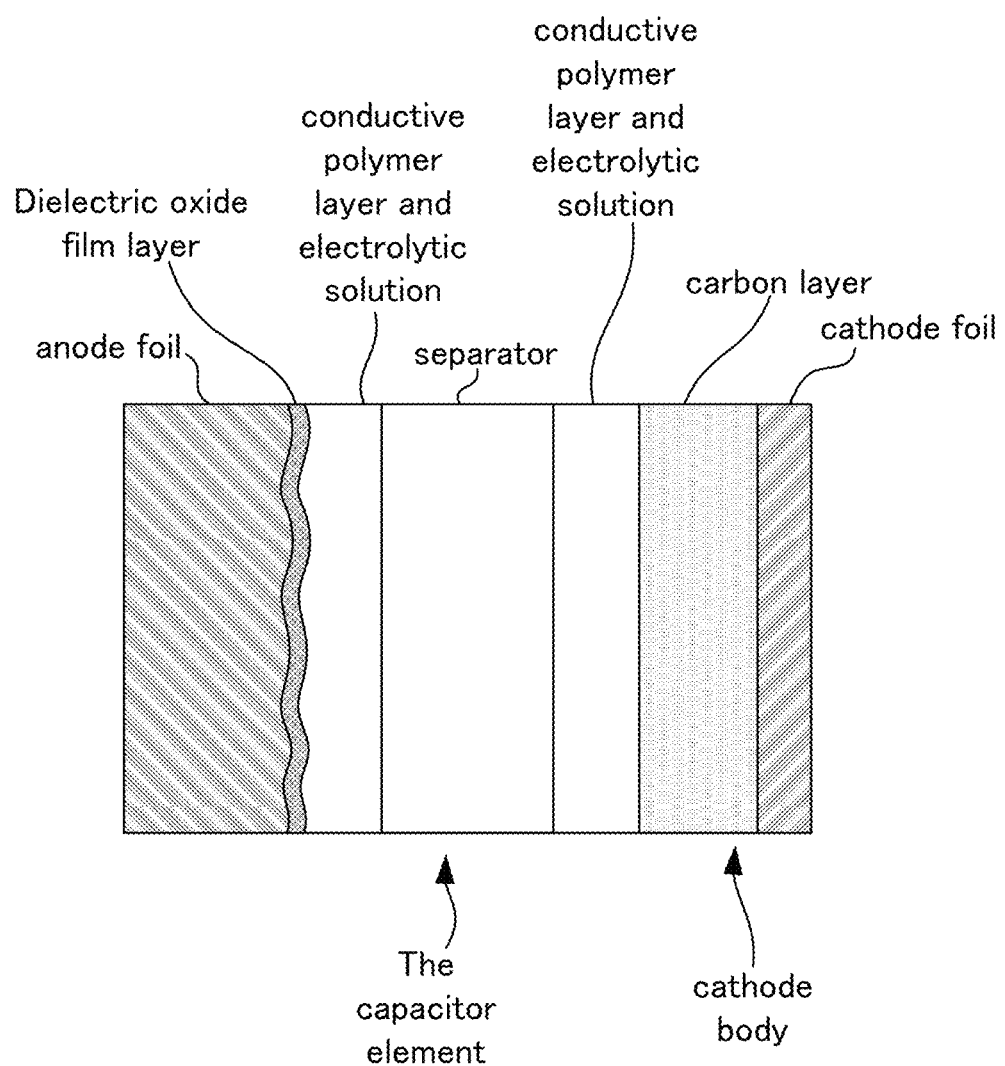
FIG. 2 is an illustration of a configuration of a solid electrolytic capacitor according to one or more embodiments.

A solid electrolytic capacitor is a passive element that stores and discharges electric charge according to capacitance, and is classified as a so-called hybrid-type which uses conductive polymer layer and electrolytic solution together. Hereinafter, the hybrid-type solid electrolytic capacitor is simply called the solid electrolytic capacitor. This solid electrolytic capacitor has a wound-type or laminated-type capacitor element. The capacitor element includes anode foil, a cathode body, conductive polymer layer, electrolytic solution, and a separator as shown in FIG. 2.

The anode foil and the cathode foil are long foil bodies formed of valve action metal. The valve action metal is aluminum, tantalum, niobium, niobium oxide, titanium, hafnium, zirconium, zinc, tungsten, bismuth, and antimony, etc. The purity of the anode foil is desirably 99.9% or more, and the purity of the cathode foil is desirably about 99% or more, however impurities such as silicon, iron, copper, magnesium, and zinc may be included. For example, aluminum material having a temper designation of H defined in JIS standard H0001, a so-called H material, or aluminum material having a temper designation of O defined in JIS standard H0001, a so-called O material, may be used as the cathode foil.

An enlarged surface layer with an enlarged surface structure is formed on one surface or both surface of the anode foil and the cathode foil. The enlarged surface layer is formed by electrolytic etching, chemical etching, or sand-blasting, and the like, or formed by vapor-depositing or sintering metal particles, and the like, on a foil body. That is, the enlarged surface layer is formed by tunnel-shaped pits, spongy pits, or air gaps between dense powder. The electrolytic etching may be DC etching or AC etching in which direct current or alternating current is applied in acidic aqueous solution with halogen ions, such as hydrochloric acid. Furthermore, in chemical etching, the metal foil is immersed in acidic solution or alkaline solution. Note that the tunnel-shaped pits may be formed in a length that penetrates through the foil or a length that does not reach the center of the foil.

Typically, dielectric oxide film of the anode foil is oxide film formed on a surface layer of the anode foil, and when the anode foil is made of aluminum, it is aluminum oxide obtained by oxidizing the surface layer of the enlarged surface area. This dielectric oxide film is formed by chemical conversion treatment in which voltage is applied in solution without halogen ions such as aqueous solution of adipic acid, boric acid or phosphoric acid, etc. The oxide film is naturally or intentionally formed on the surface layer of the cathode foil by this chemical conversion treatment. The natural oxide film that was naturally formed on the surface layer of the cathode foil is formed when oxygen in the air reacts with the cathode foil.

The cathode body includes a carbon layer in addition to the cathode foil. The carbon layer is laminated on the enlarged surface layer of the cathode foil. The carbon layer is a layer including carbon material. The carbon material is fibrous carbon, carbon powder, or a mixture thereof. It is preferable the fibrous carbon or the carbon powder is subjected to porous treatment such as activation treatment or opening treatment to form pores.

For example, the carbon powder is natural plant tissue such as coconut shell, synthetic resin such as phenol, activated carbon made from fossil fuel such as coal, coke, pitch, and the like, carbon black such as Ketjen black, acetylene black, channel black, or thermal black, carbon nanohorn, amorphous carbon, natural graphite, artificial graphite, graphitized Ketjen black, and mesoporous carbon, etc. For example, the fibrous carbon is carbon nanotube, or carbon nanofiber, etc. The carbon nanotube may be single-walled carbon nanotube with a single layer of a graphene sheet, or multi-walled carbon nanotube (MWCNT) in which two or more layers of graphene sheets are curled up on a same axis and a tube wall forms multiple layers.

The formation method of the carbon layer on the cathode foil may be vacuum vapor-deposition, sputtering, ion plating, CVD, application, electrolytic plating, or electroless plating, etc. In a case of application, the carbon material is dispersed in a dispersion solvent to form a slurry, and the slurry is applied and dried on the cathode foil by slurry casting, doctor blading, or spray spraying, and the like. In a case of vapor-deposition, the carbon material is evaporated by electrical heating in vacuum or is evaporated by electron beam irradiation in vacuum, and film of the carbon material is formed on the cathode foil. Furthermore, in the case of the sputtering, the cathode foil and a target formed of the carbon material are placed in a vacuum container, and inert gas is introduced into the vacuum container and voltage is applied to bombard the target with the plasma inert gas, so that particles of carbon material beaten out from the target is deposited on the cathode foil.

The conductive polymer layer is a layer including particles or powder of a conductive polymer. Herein, "conductive polymer" means a polymer with electrical conductivity and includes conductive polymer compounds formed by the conductive polymer and a dopant. Furthermore, herein, "particles or powder of a conductive polymer" may be any conductive polymer in a powder form or a particle form, and may include agglomerates form by agglomerating the particles or powder of the conductive polymer.

The conductive polymer is a conjugated polymer or a doped conjugated polymer. As the conjugated polymer, known polymers may be used without limitation. For example, the conjugated polymer may be polypyrrole, polythiophene, polyfuran, polyaniline, polyacetylene, polyphenylene, polyphenylenevinylene, polyacene, and polythiophenevinylene, etc. Representatively, the conductive polymer may be poly(3,4-ethylenedioxythiophene, which is called PEDOT, doped with polystyrene sulfonic acid (PSS). These conjugated polymers may be used in single or in combination of two or more, and may further be a copolymer of two or more kinds of monomers.

The solvent of the electrolytic solution is not particularly limited, and a protic organic polar solvent or an aprotic organic polar solvent may be used. Typical protic polar solvents may be monohydric alcohol, polyhydric alcohol, oxyalcohol compounds, and water. Typical aprotic organic polar solvents may be sulfones, amides, lactones, cyclic amides, nitriles, and sulfoxides including a sulfoxide.

A solute contained in the electrolytic solution contains anionic and cationic components, and is typically an organic acid or a salt thereof, an inorganic acid or a salt thereof, or a composite compound of the organic acid and the inorganic acid or a salt thereof with ion dissociative property thereof, and is used alone or in combination of two or more. Acid that is the anion and base that is the cation may be separately added to the electrolytic solution as solute components.

Furthermore, other additives may be added to the electrolytic solution. Additives may be polyethylene glycol, complex compounds of boric acid and polysaccharides (mannit, sorbit, etc.), complex compounds of boric acid and polyhydric alcohol, borate esters, nitro compounds, phosphate esters, and colloidal silica, etc. These may be used in single or in combination of two or more. The nitro compound suppresses an amount of hydrogen gas produced in the electrolytic capacitor. The nitro compound may be o-nitrobenzoic acid, m-nitrobenzoic acid, p-nitrobenzoic acid, o-nitrophenol, m-nitrophenol, and p-nitrophenol.

A separator includes cellulose such as kraft, Manila hemp, esparto, hemp, and rayon, and mixed papers thereof, polyester resin such as polyethylene terephthalate, polybutylene terephthalate, polyethylene naphthalate, and derivatives thereof, polytetrafluoroethylene resin, polyvinylidene fluoride resin, vinylon resin, aliphatic polyamide, semi-aromatic polyamide, polyamide resin such as total aromatic polyamide, polyimide resin, polyethylene resin, polypropylene resin, trimethylpentene resin, polyphenylene sulfide resin, acrylic resin, polyvinyl alcohol resin and the like, and these resins may be used alone or in combination.

Note that the separator holds the conductive polymer layer and the electrolytic solution and prevents short-circuit of the anode foil and the cathode foil. The separator may not be provided if the conductive polymer layer can keep its shape, each portion of the capacitor element including the conductive polymer layer can hold the electrolytic solution, and the conductive polymer layer has thickness enough to prevent short-circuit of the anode foil and the cathode foil without the separator.

(Overall Configuration)

The enlarged surface layer is formed on the cathode foil and the anode foil, the dielectric oxide film is formed on the anode foil, and the carbon layer is laminated on the cathode foil such as by application to form the cathode body. The anode foil and the cathode body face each other via the separator and form the capacitor element. The capacitor element is impregnated with dispersion including the solvent and the particles or powder of the conductive polymer to form the conductive polymer layer in the capacitor element. Note that, herein, "dispersion including the particles or powder of the conductive polymer" is also described as "dispersion of the conductive polymer".

The solvent of the dispersion of the conductive polymer may be any solvent if particles or powder of the conductive polymer are dispersed, and water is mainly used. However, ethylene glycol may be used as the solvent for the dispersion if necessary. It was found that when ethylene glycol is used as the solvent for the dispersion, especially ESR characteristic among the electrical characteristic of the product can be reduced. Note that to improve impregnation performance and electrical conductivity of the dispersion of the conductive polymer, various additives may be used for the dispersion of the conductive polymer and the dispersion of the conductive polymer may be neutralized by adding cations. For the dispersion of the conductive polymer, particles or powder of the polyethylenedioxythiophene (PEDOT) that is the conductive polymer doped with polystyrene sulfonic acid (PSS) may be prepared and dispersed in the solvent to form the dispersion of the conductive polymer, or polystyrene sulfonic acid (PSS) and particles or powder of the polyethylenedioxythiophene (PEDOT) may be mixed in water to polymerize the two in water to form the dispersion of the conductive polymer, For the impregnation method for the dispersion of the conductive polymer, the capacitor element may be immersed in the dispersion of the conductive polymer, or dropwise application or spray application and the like may be employed. Furthermore, the impregnation is not limited to the entire capacitor element, and the capacitor element may be assembled after the anode foil and the cathode body is impregnated with the dispersion. Depressurization process or pressurization process may be performed to facilitate the impregnation of the dispersion of the conductive polymer to the capacitor element if necessary. This adhering process may be repeated for multiple times.

By this, in the solid electrolytic capacitor, the carbon layer is formed on the enlarged surface layer of the cathode foil, and the conductive polymer layer closely contacts with the dielectric oxide film at the anode side and contacts the carbon layer, that is, the surface opposite the enlarged surface layer at the cathode side. Here, the carbon material forming the carbon layer is arranged more irregularly, so that the carbon layer has a so-called labyrinth structure in which the airgaps in the carbon layer from the surface-layer side to the enlarged surface layer is cut in the middle or meanders. Therefore, the particles or powder of the conductive polymer do not pass through the surface layer of carbon layer and reach the enlarged surface layer of the carbon layer and are trapped in the carbon layer, and as a result, the penetration of the particles or powder of the conductive polymer into the enlarged surface layer is suppressed.

Note that, when the carbon layer is sectioned from the conductive-polymer-layer side to the enlarged-surface-layer side in the depth direction, among the carbon layer, the surface-layer side of the carbon layer is a section facing the conductive polymer layer and the enlarged-surface-layer side of the carbon layer is a section facing the enlarged surface layer.

Furthermore, the average size of the air gaps that is present in the carbon layer and communicates the enlarged surface layer and the conductive polymer layer may be equal to or less than the median diameter of the particles or powder of the conductive polymer. For example, the average size of the air gaps in the carbon layer is several hundred nanometer, while the median diameter per one particle or powder of the conductive polymer is about 450 nm. Therefore, when forming the conductive polymer layer, the particles or powder of the conductive polymer in the dispersion that passes through the carbon layer and goes to the enlarged-surface-layer side is reduced.

To make the so-called labyrinth structure in which the air gaps in the carbon layer from the surface-layer side to the enlarged-surface-layer side is cut in the middle or meanders, make the size of the airgaps in the carbon layer from the surface-layer side to the enlarged-surface-layer side equal to or less than the size of the particles or powder of the conductive polymer, or use both, it is preferable that the carbon layer is compressed and press-welded to the enlarged surface layer.

For example, to compress the carbon layer and press-weld the carbon layer to the enlarged-surface-layer, pressing process to press the carbon layer to the cathode foil is performed. In the press processing, the cathode body formed by the carbon layer and the cathode foil is sandwiched by a press roller, and press linear pressure is applied. The press linear pressure is desirably about 0.01 to 100 t/cm. Furthermore, when the carbon layer is compressed and press-welded to the enlarged surface layer, the possibility for the carbon material to be liberated from the carbon layer and reaching to the anode foil is reduced. That is, the amount of the carbon material causing the reduction of the insulation performance by reaching the anode foil and attaching to the dielectric oxide film and inhibiting the repairing of the defected portion of the dielectric oxide film by attaching to said dielectric oxide film is reduced.

Furthermore, the carbon material is preferably carbon black that is spherical carbon. By using spherical carbon black with primary particle diameter of 100 nm or less, the carbon layer becomes dense and can easily adhere to the enlarged surface layer, reducing the size of the gap communicating the conductive polymer layer and the enlarged surface layer.

Furthermore, the carbon material included in the carbon layer may be flake or vein graphite and carbon black that is spherical carbon. It is preferable that the flake or vein graphite has an aspect ratio between short and long diameters of 1:5 to 1:100. When the carbon layer including this combination of the carbon material is laminated on the cathode foil, is compressed, and is press-welded to the enlarged surface layer, carbon black becomes easier to be rubbed into the enlarged surface layer by graphite. Graphite easily deforms along an uneven surface of the enlarged surface layer and can be easily laminated on the uneven surface. Accordingly, graphite acts as a pressing lid that presses and holds the spherical carbon inside the enlarged surface layer. Thus, adhesion and fixity of the carbon layer and the cathode foil are improved, and the airgaps can be downsized. Furthermore, by using the flake or vein graphite as the carbon material, paths for the particles or powder of the conductive polymer to pass through the carbon layer from the surface-layer side to the enlarged-surface-layer side are elongated, and the particles or powder of the conductive polymer is suppressed from passing through the carbon layer.

Note that the electrolytic solution can pass through the carbon layer, and is impregnated in the capacitor element so that the electrolytic solution is filled in the carbon layer and the and the enlarged surface layer.

In such solid electrolytic capacitors, large amount of the particles and powder of the conductive polymer cannot move to the enlarged surface layer. Furthermore, since the average size of the air gaps that is present in the carbon layer and that communicates the enlarged surface layer and the conductive polymer layer is equal to ore less than the diameter of the particles or powder of the conductive polymer that affect the repairing of the defect in the oxide film, large amount of the particles and powder of the conductive polymer in the dispersion cannot move to the enlarged surface layer. That is, in the carbon layer, the amount of the particles and powder of the conductive polymer present in the enlarged surface layer is smaller between the surface layer and the enlarged surface layer.

Furthermore, in the carbon layer, the amount of the particles or powder of the conductive polymer included in the carbon layer at an enlarged-surface-layer side of the carbon layer is less than the amount of the particles or powder of the conductive polymer included in the carbon layer at the surface-layer side and more than the amount of the particles or powder of the conductive polymer included in the enlarged surface layer. That is, the amount of the particles and powder of the conductive polymer gradually decreases from the surface-layer side of the carbon layer to the enlarged surface layer of the carbon layer.

Accordingly, even if the oxide film in the enlarged surface layer is defected, the defect is blocked by the particles and powder of the conductive polymer, so that it is unlikely that the electrolytic solution does not reach the defect, and the opportunity for repairing the defect is increased. Therefore, the leakage current of the solid electrolytic capacitor can be suppressed.

Note that the amount of the particles and powder of the conductive polymer can be confirmed by known methods. For example, the amount of the particles and powder of the conductive polymer in the cross-section of the cathode body can be calculated by combining elemental analysis such as SEM-EDX ((Scanning Electron Microscope)-Energy Dispersive X-ray analysis)).

Hereinafter, the solid electrolytic capacitor of the present disclosure will be described in more detail based on examples. Note that the present disclosure is not limited to the following examples.

Aluminum foil was selected as an anode foil and a cathode foil. AC etching was performed on the anode foil and the cathode foil to form enlarged surface layers formed by spongy etching pits on both surface of the foils. In the AC etching process, the cathode foil was immersed in acidic aqueous solution with hydrochloric acid having liquid temperature of 25° C. and percent by weight of 8 wt % as a main electrolyte, and current with alternating current of 10 Hz and current density of 0.14 A/cm$^2$ was applied to the substrate for about 5 minutes. Furthermore, chemical conversion process was performed on the anode foil and the cathode foil to form dielectric oxide film on a surface of the enlarged surface layer of the anode foil and form oxide film on a surface of the enlarged surface layer of the cathode foil. In the chemical conversion process, after chlorine attached in the AC etching process was removed using phosphoric acid aqueous solution, voltage was applied in aqueous solution of ammonium dihydrogenphosphate.

A carbon layer was laminated on the enlarged surface layer of the cathode foil to complete a cathode body including the cathode foil and the carbon layer. Carbon black was selected for carbon material of the carbon layer. Powder of the carbon black, styrene butadiene rubber (SBR) as a binder, and were sodium carboxymethyl cellulose (CMC-Na) aqueous solution as aqueous solution containing a dispersing agent were mixed and kneaded to produce a slurry, and the slurry was uniformly applied on the cathode foil. Then, the slurry was heated and dried to volatalize the solvent.

After the carbon layer was formed on the enlarged surface layer of the cathode foil, a pressing process to press the carbon layer to the enlarged surface is performed. In the pressing process, the cathode body was sandwiched by a press roller, and press linear pressure of 5.38 kNcm$^{-1}$. For the press line pressure, a press machine manufactured by Takumi Giken Co., Ltd. was used. In this pressing process, a diameter of the press roller was 180 mm, a press processing width was 130 mm, and the cathode body was transported once at 3 m/min.

The anode foil and the cathode body were each connected by stitch to a tab-shaped lead terminal made of aluminum. This anode foil and the cathode body was wound via a separator therebetween to produce a capacitor element including the anode foil, the cathode body, and the separator. A manila-type separator was used as the separator. After the winding, the capacitor elements was immersed in aqueous solution of ammonium dihydrogen phosphate and current was applied to repair defects produced by winding. The capacitor element pulled out from the aqueous solution of ammonium dihydrogen phosphate was exposed and dried at temperature of 105° C. for 30 minutes.

Next, dispersion of conductive polymer was prepared. The dispersion is formed by dispersing powder of polyethylene dioxythiophene (PEDOT) doped with polystyrene sulfonic acid (PSS) in water. The capacitor element is immersed in this dispersion. During the immersion, pressure of 30 kPA was applied for 120 seconds. Then, the capacitor element was pulled out and dried at 150° C. for 30 minutes. The immersion and drying were repeated twice By this, a conductive polymer layer including polyethylene dioxythiophene (PEDOT) doped with polystyrene sulfonic acid (PSS) as the conductive polymer was adhered to dielectric oxide film of the anode foil or was laminated on a carbon layer of the cathode body.

Next, electrolytic solution was prepared, and the capacitor element on which the conductive polymer layer had been formed was impregnated with the electrolytic solution. Ethylene glycol as a solvent and ammonium azelaic acid as a solute were added to prepare the electrolytic solution. The capacitor element was inserted into a bottomed cylindrical outer casing, a sealing rubber was attached to an end of an opening and the casing was sealed by a crimping process.

The solid electrolytic capacitor was aged. The solid electrolytic capacitor of the example produced as above had constant resistance voltage of 25 WV, constant capacity of 270 μF, and size of 10 mm in diameter and 8 mm in height.

A solid electrolytic capacitor of the comparative example for the comparison with the solid electrolytic capacitor of the example was produced. The cathode body of the solid electrolytic capacitor of the comparative example included only the cathode foil. The carbon layer was not laminated on the enlarged surface layer of the cathode foil. The solid electrolytic capacitor of the comparative example was produced by the same structure, same composition, same production method, and same condition as that of the solid electrolytic capacitor of the example, except for the above point.

Furthermore, a solid electrolytic capacitor of the reference example for the comparison with the solid electrolytic capacitor of the example was produced. The cathode body of the solid electrolytic capacitor of the reference example includes the carbon layer with carbon nanotube as the carbon material on the enlarged surface layer of the cathode foil. However, the enlarged surface layer was not formed on the cathode foil and the pressing process to press the carbon layer on the cathode foil was omitted to reduce the adhesion of the cathode foil to the carbon layer. The solid electrolytic capacitor of the reference example was produced by the same structure, same composition, same production method, and same condition as that of the solid electrolytic capacitor of the example, except for the above point.

30 solid electrolytic capacitors were produced for each of the example, comparative example, and reference example, and leakage current (LC) of each was measured. To measure the leakage current, the solid electrolytic capacitor was placed in the temperature environment of 20° C., the constant voltage of 25 V was applied, and the leakage current was measure after predetermined time had elapsed. Average values, maximum values, and minimum values of the leakage current for the example, comparative example, and reference example obtained from the measurement result is indicated in the below table 1. Furthermore, FIG. 1, with the example, comparative example, and reference example aligned in series on the horizontal axis and the leakage current on the vertical axis was created.

TABLE 1

|  | Example | Comparative Example | Reference Example |
|---|---|---|---|
| Average [µA] | 0.47 | 0.83 | 4.41 |
| Maximum [µA] | 0.68 | 0.99 | 72.35 |
| Minimum [µA] | 0.27 | 0.75 | 0.57 |

The example is a solid electrolytic capacitor, which was produced by firstly forming the enlarged surface layer on the cathode foil, secondly forming the carbon layer on the enlarged surface layer, and thirdly pressing the enlarged surface layer to the carbon layer by the pressing process to compress and press-weld the carbon layer on the enlarged surface layer. In contrast, in the comparative example, the enlarged surface layer is blocked and there is no carbon layer that inhibits the conductive polymer layer and the enlarged surface layer to communicate with each other. Furthermore, in the reference example, there is the carbon layer that blocks the enlarged surface layer, but the carbon layer is not formed on the cathode foil, and the pressing process to press the carbon layer to the cathode foil was not performed.

Figure 1:
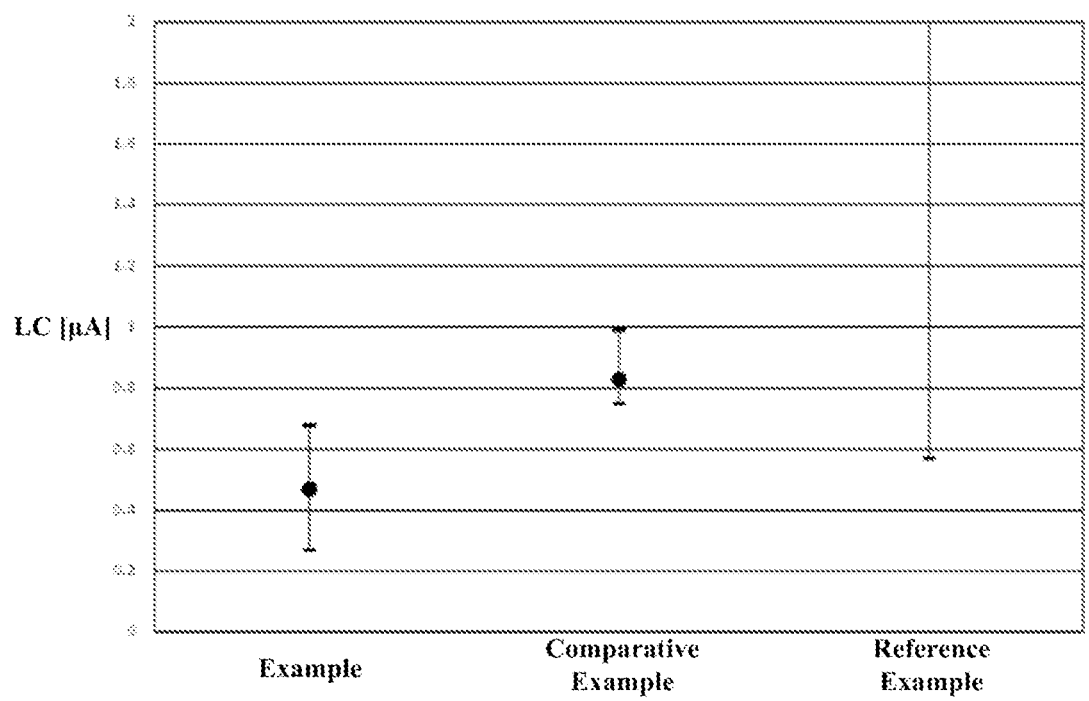
FIG. 1 is a graph indicating leakage current of the example, the comparative example, and the reference example.

Therefore, as shown in the table 1 and FIG. 1, the leakage current was not suppressed in the solid electrolytic capacitors of the comparative example and reference example, and the leakage current was suppressed in the solid electrolytic capacitor of the example than the comparative example and reference example That is, in the solid electrolytic capacitor of the example, the carbon was pressed. By this, air gaps formed by carbon black that is the carbon material from a surface-layer side to the enlarged surface layer of the carbon layer was cut in the middle. Furthermore, the carbon layer had a so-called labyrinth structure in which the airgaps in the carbon layer from the surface-layer side to the enlarged surface layer had been meandered. Therefore, the conductive polymer cannot move through the carbon layer and attach to oxide film of the enlarged surface layer and a defected portion is not blocked by the conductive polymer, increasing the opportunity for the electrolytic solution to repair the defected portion.

Note that it was observed by the solid electrolytic capacitor of the reference example that just attaching the carbon layer to the cathode foil without forming the enlarged surface layer on the cathode foil and without controlling the size of the airgaps of the carbon layer rather worsened the leakage current. It is considered that the carbon material liberated from the carbon layer attached to the dielectric oxide film of the anode foil, reducing the insulation of the dielectric oxide film and blocking the defected portion of the dielectric oxide film.

The invention claimed is:

1. A solid electrolytic capacitor, comprising:
  a capacitor element formed by anode foil and a cathode body facing each other;
  a conductive polymer layer formed by impregnating dispersion including a solvent and particles or powder of a conductive polymer; and
  electrolytic solution impregnated in the capacitor element, wherein:
  the cathode body comprises:
    cathode foil formed of valve action metal and with an enlarged surface layer on a surface thereof; and
    a carbon layer laminated on the enlarged surface layer and contacting with the conductive polymer layer opposite the enlarged surface layer, and
  an amount of the particles or powder of the conductive polymer included in the enlarged surface layer is less than an amount of the particles or powder of the conductive polymer included in the carbon layer at a surface-layer side facing the conductive polymer layer,
  the carbon layer includes a plurality of air gaps formed by the carbon material, and
  average size of the air gaps is equal to or less than a median diameter of the particles or powder of the conductive polymer.

2. The solid electrolytic capacitor according to claim 1, wherein an amount of the particles or powder of the conductive polymer included in the carbon layer at an enlarged-surface-layer side facing the enlarged surface is less than the amount of the particles or powder of the conductive polymer included in the carbon layer at the surface-layer side and more than an amount of the particles or powder of the conductive polymer included in the enlarged surface layer.

3. The solid electrolytic capacitor according to claim 1, wherein the electrolytic solution can pass through the carbon layer.

4. The solid electrolytic capacitor according to claim 1, wherein the carbon layer is compressed and pressure-welded to the enlarged surface layer.

5. The solid electrolytic capacitor according to claim 1, wherein oxide film is formed on the enlarged surface layer.

6. The solid electrolytic capacitor according to claim 2, wherein the electrolytic solution can pass through the carbon layer.

7. The solid electrolytic capacitor according to claim 2, wherein the carbon layer is compressed and pressure-welded to the enlarged surface layer.

8. The solid electrolytic capacitor according to claim 3, wherein the carbon layer is compressed and pressure-welded to the enlarged surface layer.

9. The solid electrolytic capacitor according to claim 6, wherein the carbon layer is compressed and pressure-welded to the enlarged surface layer.

10. The solid electrolytic capacitor according to claim 6, wherein oxide film is formed on the enlarged surface layer.

11. The solid electrolytic capacitor according to claim 9, wherein oxide film is formed on the enlarged surface layer.

12. The solid electrolytic capacitor according to claim 8, wherein oxide film is formed on the enlarged surface layer.

13. The solid electrolytic capacitor according to claim 4, wherein oxide film is formed on the enlarged surface layer.

14. A production method of a solid electrolytic capacitor, comprising:
  a process of forming a carbon layer on an enlarged surface layer formed on cathode foil formed of valve action metal;
  a process of pressing the carbon layer on the cathode foil;
  a process of forming a capacitor element by facing a cathode body including the cathode foil and the carbon layer and anode foil facing each other;
  a process of impregnating the capacitor element with dispersion including a solvent and particles or powder of a conductive polymer; and
  a process of impregnating the capacitor element with electrolytic solution,
  wherein:
  the carbon layer includes a plurality of air gaps formed by the carbon material, and the process of pressing the carbon layer on the cathode foil is so that average size of the air gaps is equal to or less than a median diameter of the particles or powder of the conductive polymer.

* * * * *